(12) United States Patent
Humphreys et al.

(10) Patent No.: US 12,189,870 B2
(45) Date of Patent: Jan. 7, 2025

(54) LEARNED COMPUTER CONTROL USING POINTING DEVICE AND KEYBOARD ACTIONS

(71) Applicant: DeepMind Technologies Limited, London (GB)

(72) Inventors: Peter Conway Humphreys, London (GB); Timothy Paul Lillicrap, London (GB); Tobias Markus Pohlen, London (GB); Adam Anthony Santoro, London (GB)

(73) Assignee: Deep Mind Technologies Limited, London (GB)

( * ) Notice: Subject to any disclaimer, the term of this patent is extended or adjusted under 35 U.S.C. 154(b) by 0 days.

(21) Appl. No.: 18/103,309

(22) Filed: Jan. 30, 2023

(65) Prior Publication Data

US 2023/0244325 A1    Aug. 3, 2023

Related U.S. Application Data

(60) Provisional application No. 63/304,549, filed on Jan. 28, 2022.

(51) Int. Cl.
*G06F 3/023* (2006.01)
*G06F 3/033* (2013.01)
*G06F 40/284* (2020.01)

(52) U.S. Cl.
CPC .............. *G06F 3/033* (2013.01); *G06F 3/023* (2013.01); *G06F 40/284* (2020.01)

(58) Field of Classification Search
CPC . G06F 3/01; G06F 3/023; G06F 3/033; G06F 3/038; G06F 3/048; G06F 3/0488;
(Continued)

(56) References Cited

U.S. PATENT DOCUMENTS

2019/0122258 A1*  4/2019  Bramberger ............ G06N 3/08
2020/0285932 A1*  9/2020  Singh .................... G06N 5/022
(Continued)

FOREIGN PATENT DOCUMENTS

CN       112822845       5/2021

OTHER PUBLICATIONS

Abramson et al., "Creating multimodal interactive agents with imitation and self- supervised learning," CoRR, Dec. 7, 2021, arXiv:2112.03763, 17 pages.
(Continued)

*Primary Examiner* — Ryan A Lubit
(74) *Attorney, Agent, or Firm* — Fish & Richardson P.C.

(57) ABSTRACT

A computer-implemented method for controlling a particular computer to execute a task is described. The method includes receiving a control input comprising a visual input, the visual input including one or more screen frames of a computer display that represent at least a current state of the particular computer; processing the control input using a neural network to generate one or more control outputs that are used to control the particular computer to execute the task, in which the one or more control outputs include an action type output that specifies at least one of a pointing device action or a keyboard action to be performed to control the particular computer; determining one or more actions from the one or more control outputs; and executing the one or more actions to control the particular computer.

32 Claims, 5 Drawing Sheets

(58) Field of Classification Search
CPC ..... G06F 3/167; G06F 40/284; G06N 3/0442; G06N 3/0455; G06N 3/0464; G06N 3/0475; G06N 3/092

See application file for complete search history.

(56) References Cited

U.S. PATENT DOCUMENTS

| | | | | |
|---|---|---|---|---|
| 2021/0027774 | A1* | 1/2021 | Kessler | G06F 3/167 |
| 2022/0171936 | A1* | 6/2022 | Wang | G06F 40/289 |
| 2022/0309364 | A1* | 9/2022 | Perry | A63F 13/56 |
| 2022/0366152 | A1* | 11/2022 | Zenkel | G06N 3/045 |
| 2022/0398497 | A1* | 12/2022 | Shimizu | G08G 1/0145 |
| 2022/0404956 | A1* | 12/2022 | Choi | H04N 21/42222 |
| 2023/0038673 | A1* | 2/2023 | Masoud | B60W 30/095 |
| 2023/0120397 | A1* | 4/2023 | Cronie | G16H 50/30 706/20 |
| 2023/0192141 | A1* | 6/2023 | Zhang | G06V 10/25 |

OTHER PUBLICATIONS

Ammanabrolu et al., "How to motivate your dragon: Teaching goal-driven agents to speak and act in fantasy worlds," CoRR, Oct. 1, 2020, arXiv:2010.00685, 27 pages.

Bommasani et al., "On the opportunities and risks of foundation models," CoRR, Aug. 16, 2021, arXiv:2108.07258, 214 pages.

Botvinick et al., "Reinforcement Learning, Fast and Slow," Trends in Cognitive Sciences, May 2019, 23(5):408-422.

Brown et al., "Language models are few-shot learners," CoRR, May 28, 2020, arXiv:2005.14165, 75 pages.

Chen et al., "Evaluating large language models trained on code," CoRR, Jul. 7, 2021, arXiv:2107.03374, 35 pages.

Christiano et al., "Deep reinforcement learning from human preferences," CoRR, Jun. 12, 2017, arXiv:1706.03741, 17 pages.

Github.com [online], "google/sandboxed-api," Nov. 2021, retrieved on Jun. 30, 2023, retrieved from URL<https://github.com/google/sandboxed-api/tree/main/sandboxed api/sandbox2/>, 5 pages.

Github.com [online], "Security Considerations," Jan. 2019, retrieved on Jun. 30, 2023, retrieved from URL<https://chromedriver.chromium.org/security-considerations/>, 1 page.

Gur et al. "Environment generation for zero-shot compositional reinforcement learning," Advances in Neural Information Processing Systems 34, 2021, 13 pages.

Gur et al., "Learning to navigate the web," CoRR, Dec. 21, 2018, arXiv:1812.09195, 12 pages.

Ibarz et al., "Reward learning from human preferences and demonstrations in Atari," CoRR, Nov. 15, 2018, arXiv:1811.06521, 20 pages.

International Search Report and Written Opinion in International Appln. No. PCT/EP2023/052210, dated Apr. 3, 2023, 18 pages.

Jaques et al., "Way off-policy batch deep reinforcement learning of implicit human preferences in dialog," CoRR, Jun. 30, 2019, arXiv:1907.00456, 16 pages.

Jia et al., "DOM-Q-NET: Grounded rl on structured language," CoRR, Feb. 19, 2019, arXiv:1902.07257, 17 pages.

Kaplan et al., "Scaling laws for neural language models," CoRR, Jun. 23, 2020, arXiv:2001.08361, 30 pages.

Kingma et al., "Adam: A method for stochastic optimization," CoRR, Dec. 22, 2014, arXiv:1412.6980, 15 pages.

Li et al., "Dialogue learning with human-in-the-loop," CoRR, Nov. 29, 2016, arXiv:1611.09823, 23 pages.

Li et al., "Mapping natural language instructions to mobile UI action sequences," CoRR, May 7, 2020, arXiv:2005,03776, 13 pages.

Liu et al., "Reinforcement learning on web interfaces using workflowguided exploration," CoRR, Feb. 24, 2018, arXiv:1802.08802, 15 pages.

Nakano et al., "Webgpt: Browser-assisted question-answering with human feedback," CoRR, Dec. 17, 2021, arXiv:2112.09332, 32 pages.

Pomerleau, "ALVINN: An autonomous land vehicle in a neural network," Advances in neural information processing systems, 1988, pp. 305-313.

Rae et al., "Scaling language models: Methods, analysis & insights from training gopher," CoRR, Dec. 8, 2021, arXiv:2112.11446, 120 pages.

Shi et al., "World of bits: An open-domain platform for webbased agents," Proceedings of the 34th International Conference on Machine Learning, 2017, pp. 3135-3144.

Shoeybi et al., "Megatron-lm: Training multibillion parameter language models using model parallelism," CoRR, Sep. 17, 2019, arXiv:1909.08053, 15 pages.

Shvo et al., "Appbuddy: Learning to accomplish tasks in mobile apps via reinforcement learning," CoRR, May 31, 2021, arXiv:2106.00133, 17 pages.

Silver et al., "Mastering the game of Go with deep neural networks and tree search," Nature, 2016, 529(7587):484-489.

Song et al., "V-MPO: On-policy maximum a posteriori policy optimization for discrete and continuous control," CoRR, Sep. 26, 2019, arXiv:1909.12238, 19 pages.

Stiennon et al., "Learning to summarize from human feedback," CoRR, Sep. 2, 2020, arXiv:2009.01325, 45 pages.

Sutton et al., "Reinforcement learning: An introduction," MIT press, Nov. 13, 2018, 10 pages.

Toyama et al., "Androidenv: A reinforcement learning platform for android," CoRR, May 27, 2021, arXiv:2105.13231, 13 pages.

Vaswani et al., "Attention is all you need," Advances in neural information processing systems, 2017, 11 pages.

Vinyals et al., "Grandmaster level in starcraft II using multi-agent reinforcement learning," Nature, Oct. 30, 2019, 575(7782):350-354.

Wirth et al., "A survey of preference-based reinforcement learning methods," Journal of Machine Learning Research, 2017, 18(136):1-46.

Office Action in Australian Appln. No. 2023211162, dated Aug. 8, 2024, 4 pages.

* cited by examiner

LEARNED COMPUTER CONTROL USING POINTING DEVICE AND KEYBOARD ACTIONS

CROSS REFERENCE TO RELATED APPLICATIONS

This application is a non-provisional of and claims priority to U.S. Provisional Patent Application No. 63/304,549, filed on Jan. 28, 2022, the entire contents of which are hereby incorporated by reference.

BACKGROUND

This specification relates to a system that controls a particular computer to execute a task using a neural network.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a neural network system implemented as computer programs on one or more computers in one or more locations that controls a particular computer to execute a task.

According to a first aspect, a method for controlling a particular computer to execute a task is provided. The method includes receiving a control input including a visual input, the visual input including one or more screen frames of a computer display that represent at least a current state of the particular computer; processing the control input using a neural network to generate one or more control outputs that are used to control the particular computer to execute the task, in which the one or more control outputs include an action type output that specifies at least one of a pointing device action or a keyboard action to be performed to control the particular computer; determining one or more actions from the one or more control outputs; and executing the one or more actions to control the particular computer.

In some implementations, the pointing device action is one of a plurality of actions of a pointing device associated with the particular computer, the plurality of actions including one or more of: inputs submitted using a computer mouse, inputs submitted through a touchscreen device, or inputs submitted through a touchpad device.

In some implementations, the keyboard action is one of a key press or a text emission.

In some implementations, a screen frame in the visual input is an image that represents a step in a process of executing the task on the particular computer.

In some implementations, the control input further includes one or more language inputs, one or more previous controls, or both.

In some implementations, the one or more language inputs include at least one of i) a task instruction input, or ii) a task field input comprising one or more task fields.

In some implementations, the one or more language inputs include a Document Object Model (DOM) element input including one or more DOM elements. In an implementation, the task instruction input includes a text instruction input or a voice instruction input.

In some implementations, the one or more control outputs further include at least one of i) a cursor coordinate output, ii) a keyboard key index output, or iii) a task filed index output.

In some implementations, the cursor coordinate output includes an x-coordinate and a y-coordinate that represent a desired cursor position on the display of the particular computer.

In some implementations, the task is one of a plurality of tasks performed on the particular computer, the plurality of tasks including clicking on a canvas, dragging an item on the screen, filling a form, editing text, highlighting text, forwarding an email, making a reservation, and booking a ticket.

In some implementations, the neural network includes a visual processing sub-network, one or more language processing sub-networks, a previous control processing sub-network, a multimodal transformer sub-network, and an output sub-network, and wherein processing the control input using the neural network to generate the one or more control outputs includes: processing, using the visual processing sub-network, the visual input to generate one or more visual embeddings; processing each language input in the one or more language inputs using the language processing sub-network to generate a respective language embedding; processing, using the previous control processing sub-network, the one or more previous controls to generate a previous control embedding; combining, using a multimodal transformer sub-network, the one or more visual embeddings and the one or more language embeddings to generate a transformed embedding; and processing, using the output sub-network, the transformed embedding and the previous control embedding to generate the one or more control outputs.

In some implementations, the visual processing sub-network includes a image encoder sub-network and a flattening sub-network, and processing, using the visual processing sub-network, the visual input to generate one or more visual embeddings includes: processing, using the image encoder sub-network, the visual input to generate one or more encoded visual feature vectors, and flattening the one or more encoded visual feature vectors by using the flattening sub-network to generate the one or more visual embeddings.

In some implementations, the image encoder sub-network is a ResNet which has four ResNet blocks.

In some implementations, each language processing sub-network includes a tokenization layer and a language encoder sub-network, and processing the language input in the one or more language inputs using the language processing sub-network to generate the respective language embedding includes: splitting, using the tokenization layer, the respective language input into tokens and generating, for each token in the tokens, a corresponding token embedding, and attending over the token embeddings by using the language encoder sub-network to generate the corresponding language embedding.

In some implementations, the language encoder sub-network is a 1-layer transformer with 4 heads.

In some implementations, attending over the token embeddings to generate the corresponding language embedding includes: processing the token embeddings to generate a key vector and a value vector, processing an extra embedding to generate a query vector, and processing the key vector, the value vector, and the query vector using a cross-attention mechanism to generate the corresponding language embedding.

In some implementations, generating the transformed embedding using the multimodal transformer sub-network includes: processing the one or more visual embeddings to generate a visual query vector, a visual key vector, and a visual value vector, processing the one or more language embeddings to generate a language query vector, a language key vector, and a language value vector, processing one or more additional embeddings to generate an extra query vector, an extra key vector, and an extra value vector, using a self-attention mechanism to process the visual query vector, the visual key vector, the visual value vector, the language query vector, the language key vector, the language value vector, the extra query vector, the extra key vector, the extra value vector to generate the transformed embedding.

In some implementations, the output sub-network includes one or more long short-term memory (LSTM) layers.

In some implementations, the output sub-network further includes an attention policy sub-network configured to process an output of the one or more LSTM layers to generate a task field index output.

In some implementations, the attention policy sub-network is configured to use the corresponding output of the two LSTM layers as a query vector, process the corresponding task field embeddings generated by the task field language processing sub-network to generate a key vector and a value vector, and use a cross-attention mechanism to process the query vector, the key vector, and the value vector to generate the task field index output.

In some implementations, further comprising: co-training the neural network using i) imitation learning to imitate one or more behaviors of human demonstration, and ii) reinforcement learning.

In some implementations, the method further includes training the neural network using imitation learning to imitate the behavior of human demonstration as shown in the visual input, and training the neural network using reinforcement learning.

In some implementations, during training of the neural network, the visual input demonstrates how a human would execute the task on the particular computer.

In some implementations, processing, using the output sub-network, the transformed embedding and the previous control embedding to generate the one or more control outputs comprising: processing, using the output sub-network, a concatenation of the transformed embedding and the previous control embedding to generate the one or more control outputs.

In some implementations, the neural network has been trained using imitation learning, and optionally, reinforcement learning.

In some implementations, the action type output specifies an action to take control of the particular computer from another operator for a portion of a process of executing the task.

In some implementations, the particular computer receives one or more inputs from a human user to control the particular computer to perform a first portion of task, and, upon receiving a command from a user, the neural network takes control of the particular computer, whereby the neural network generates one or more actions to control the particular computer to perform a second portion of the task which follows the first portion.

According to a second aspect, there is provided a system including one or more computers and one or more storage devices storing instructions that are operable, when executed by the one or more computers, to cause the one or more computers to perform the operations of a method according to the first aspect.

According to a third aspect, there is provided one or more computer storage media encoded with instructions that, when executed by one or more computers, cause the one or more computers to perform the operations of a method according to the first aspect.

According to a third aspect, there is provided a system including one or more computers and one or more storage devices storing instructions that, when executed by the one or more computers, cause the one or more computers to implement a neural network configured to process a control input to generate one or more control outputs for controlling a particular computer to execute a task, the control input including (i) a visual input including one or more screen frames of a computer display that represent at least a current state of the particular computer, (ii) one or more language inputs, and (iii) one or more previous controls, the neural network including: a visual processing sub-network configured to process the visual input to generate one or more visual embeddings; one or more language processing sub-networks, each language processing sub-network configured to process a language input in the one or more language inputs to generate a respective language embedding; a previous control processing sub-network to process the one or more previous controls to generate a previous control embedding; a multimodal transformer sub-network configured to combine the one or more visual embeddings and the one or more language embeddings to generate a transformed embedding; and an output sub-network configured to process the transformed embedding and the previous control embedding to generate the one or more control outputs.

It will be appreciated that aspects can be implemented in any convenient form. For example, aspects and implementations may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs.

Particular embodiments of the subject matter described in this specification can be implemented so as to realize one or more of the following advantages. Unlike existing systems that require access to Document Object Model (DOM) elements and output DOM-element based actions, the described neural network system typically receives inputs that are available to a human user and generates outputs that are intuitive to human (e.g., outputs that specify mouse/touchscreen and keyboard based actions). The actions output by the described neural network system are directly observable from logs of human interactions with a computer because they are keyboard and pointing device actions, thus allowing for easy collection of a large amount of data. In addition, collecting a large training dataset that has inputs and outputs in the same space as those processed and generated by the described neural network system is greatly simplified because no privileged information needs to be included in the training data. Therefore, the described system can be effectively trained through imitation learning (and, optionally, reinforcement learning) using a large amount of data to achieve state-of-the-art performance. Further, the described system can be used to perform tasks that require pointing device/keyboard actions (e.g., clicking or dragging actions) that cannot be achieved with DOM-element based actions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a neural network system implemented as computer programs on one or more computers in one or more locations that controls a particular computer to execute a task.

The particular computer can be, for example, a desktop, a laptop, a remote computer residing at a cloud computing system, a mobile device (e.g., a mobile phone, a tablet, etc.), or any type of a computing system.

Figure 3:
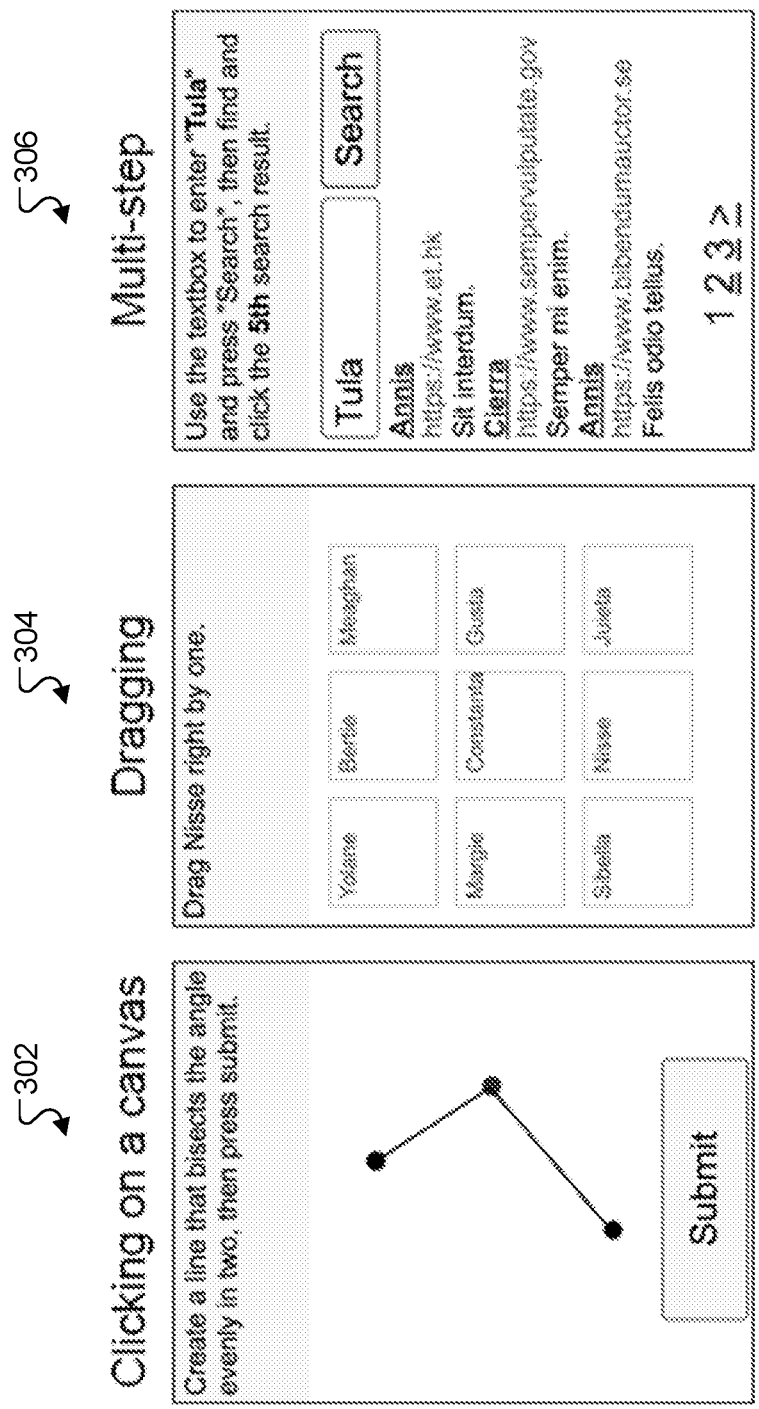
FIG. 3 shows examples of tasks that require different forms of interaction with the particular computer.

The task is a task that requires a set of computer interactions (that is, interactions between the particular computer and an operator, which may be a human operator or the present neural network system). For example, as illustrated in FIG. 3, the task can be clicking on a canvas (302). In this task, a computer under the control of an operator is required to create a line that bisects an angle evenly in two, and then press a submit button. As another example, the task can be dragging an item on the screen (304). As yet another example, the task can be a multi-step task (306) such as using a textbox to enter a term and press "Search," then find and click the $5^{th}$ search result. Other examples of tasks include, but are not limited to, filling a form, editing text, highlighting text, forwarding an email, making a reservation by navigating the Internet using a web browser or other application, and booking a ticket by navigating the Internet.

Figure 1:
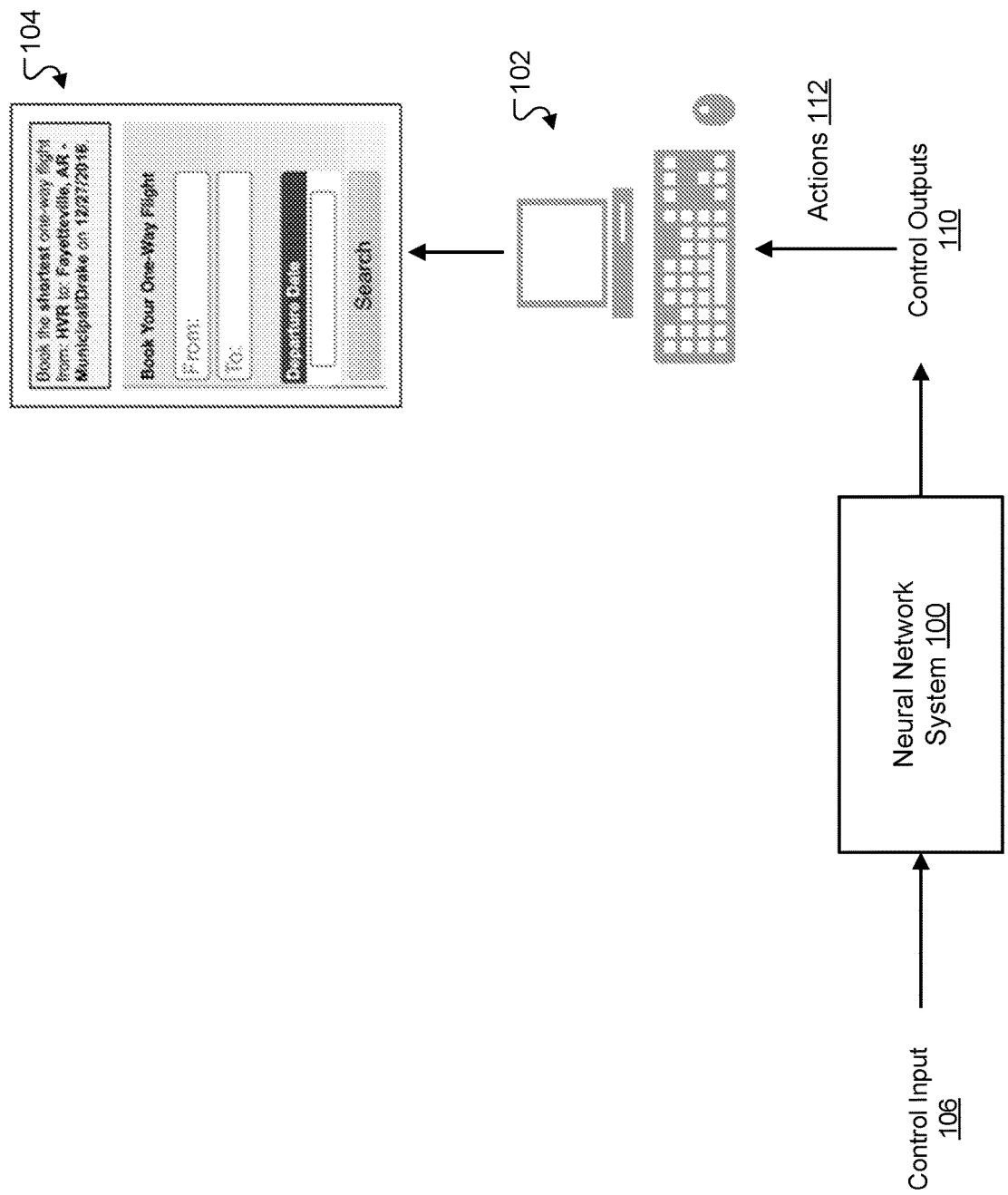
FIG. 1 illustrates a neural network system configured to control a particular computer to execute a task.

FIG. 1 illustrates a neural network system 100 configured to control a particular computer 102 to execute a task. The neural network system 100 is an example of a system implemented as computer programs on one or more computers in one or more locations, in which the systems, components, and techniques described below can be implemented.

In some implementations, the neural network system 100 is implemented as one or more computer programs on the particular computer 102. In some other implementations, the neural network system 100 is implemented as one or more computer programs on a cloud computing system or other set of one or more computers that are remote from the particular computer 102.

The neural network system 100 receives a task instruction that specifies the task to be performed. The system 100 then controls the particular computer 102 to perform the task by performing the following operations at each of a series of time steps during the execution of the task. First, the neural network system 100 is configured to receive a control input 106 that includes a visual input. The visual input includes one or more screen frames of a computer display that represent at least a current state of the particular computer 102. A screen frame in the visual input is an image that represents a step in a process of executing the task on the particular computer. For example, the screen frame may be an image which a display device of the particular computer 102 would display, at that stage of performing the task, to a human operator who interacts with the particular computer to perform the task.

The control input 106 may further include one or more language inputs, one or more previous controls, or both. A previous control is a control output generated by the neural network system 100 at a previous time step.

The one or more language inputs include at least one of i) a task instruction input, or ii) a task field input including one or more task fields. The task instruction input includes a text instruction input (e.g. text entered by a user using a keyboard) or a voice instruction input (e.g. sound data captured using a microphone from speech of a human user; optionally the captured sound data may be processed by a natural language processing system to generate the voice instruction input). Optionally, the one or more language inputs may include a Document Object Model (DOM) element input including one or more DOM elements. For example, the DOM element input may be a document according to the DOM4 standard, or the WHATWG (Web Hypertext Application Technology Working Group).

The neural network system 100 is configured to process the control input 106 using a neural network to generate one or more control outputs 110 that are used to control the particular computer 102 to execute a task (e.g., task 104 which is booking a flight). The one or more control outputs 110 are actions that are based on a pointing device or a keyboard (i.e., pointing device/keyboard-based actions) and are not DOM-element based actions.

The terms "keyboard" and "pointing device" refer to any types of keyboard and pointing device that could be used to operate a computing device. Examples of a keyboard include, but are not be limited to, a laptop keyboard, a desktop keyboard, an application-specific keyboard as might be used in a point-of-sale device, e.g. at a restaurant or shop; keys/buttons on a remote control; keys/buttons on a mobile phone; and/or keys/buttons on a game controller. Examples of pointing devices include, but are not limited to, a mouse, an analogue stick, a suitably calibrated accelerometer, an infrared pointer, or an eye tracking device.

The one or more control outputs 110 include at least one of an action type output, a cursor coordinate output, a keyboard key index output, or a task field index output.

An action type output specifies at least one of a pointing device action of a pointing device or a keyboard action to be performed to control the particular computer. For example, when the pointing device is a mouse, the pointing device action can include moving a cursor and clicking various buttons on a mouse. As another example, when the pointing device has a touchscreen display, the pointing device actions can include any kind of touch input on the display, e.g., as submitted by a user's finger or by a stylus pen.

An action type may be selected, based on the action type output, from a set of possible actions including a no-op (indicating no action), mouse or touch-screen actions and keyboard actions. The mouse or touch-screen actions may include: move, click, double click, press, release, wheel up, and wheel down.

The keyboard action can be, for example, a key press or a text emission. A keyboard action which is a key press is used to emit (that is, generate and output data specifying) a keyboard key or one of a set of small macros (such as CTRL+C). A keyboard action which is a text emission is used to emit a string given by a task field index output.

A task field index output allows the neural network system 110 to choose the task field strings to emit. A cursor coordinate output includes an x-coordinate and a y-coordinate that represent a desired cursor position on the display of the particular computer.

Processing the control input to generate the one or more control outputs is described in more detail below with reference to FIG. 5.

After generating the one or more control outputs, the neural network system 100 determines one or more actions 112 from the one or more control outputs 110. Each control output of the one or more control outputs 110 can be modeled by a probability distribution (e.g., a single discrete probability distribution, except for cursor coordinates which are modeled by two discrete distribution (for height and width coordinates)). As discussed above, the one or more control outputs 110 include at least one of an action type output, a cursor coordinate output, a keyboard key index output, or a task field index output. To determine the one or more actions 112, the system 100 first selects, based on the action type output (which is a probability distribution), an action type from a set of possible actions including a no-op (indicating no action), mouse or touch-screen actions and keyboard actions. The one or more actions of the selected action type will be carried out as specified in the remainder of the one or more control outputs 110. For example, if the mouse action "move mouse" was selected, a cursor coordinate output included in the one or more control outputs 110 specifies the location that the cursor should be moved to. If the keyboard action "emit text" was selected, a task-field index output included in the one or more control inputs specifies which task-field string to emit. If the keyboard action "key press" was selected, a keyboard key index output included in the control inputs specifies which key to emit. If the control outputs 110 do not include one of the cursor coordinate output, the task-field index output or a keyboard key index output, then the action type output should specify zero-probability for the corresponding action type.

The system 100 executes the one or more actions 112 to control the particular computer 102. In particular, the system 100 automatically issues commands using a computer control Application Programming Interface (API) or another interface made available to the system 100 to instruct the particular computer 102 to perform the one or more actions 112.

The neural network system 100 can have any appropriate architecture that allows the neural network to map a control input 106 to the one or more control outputs 110 to control a particular computer 102 to execute a task. An example of the architecture of the neural network system 100 is illustrated in FIG. 2.

Figure 2:
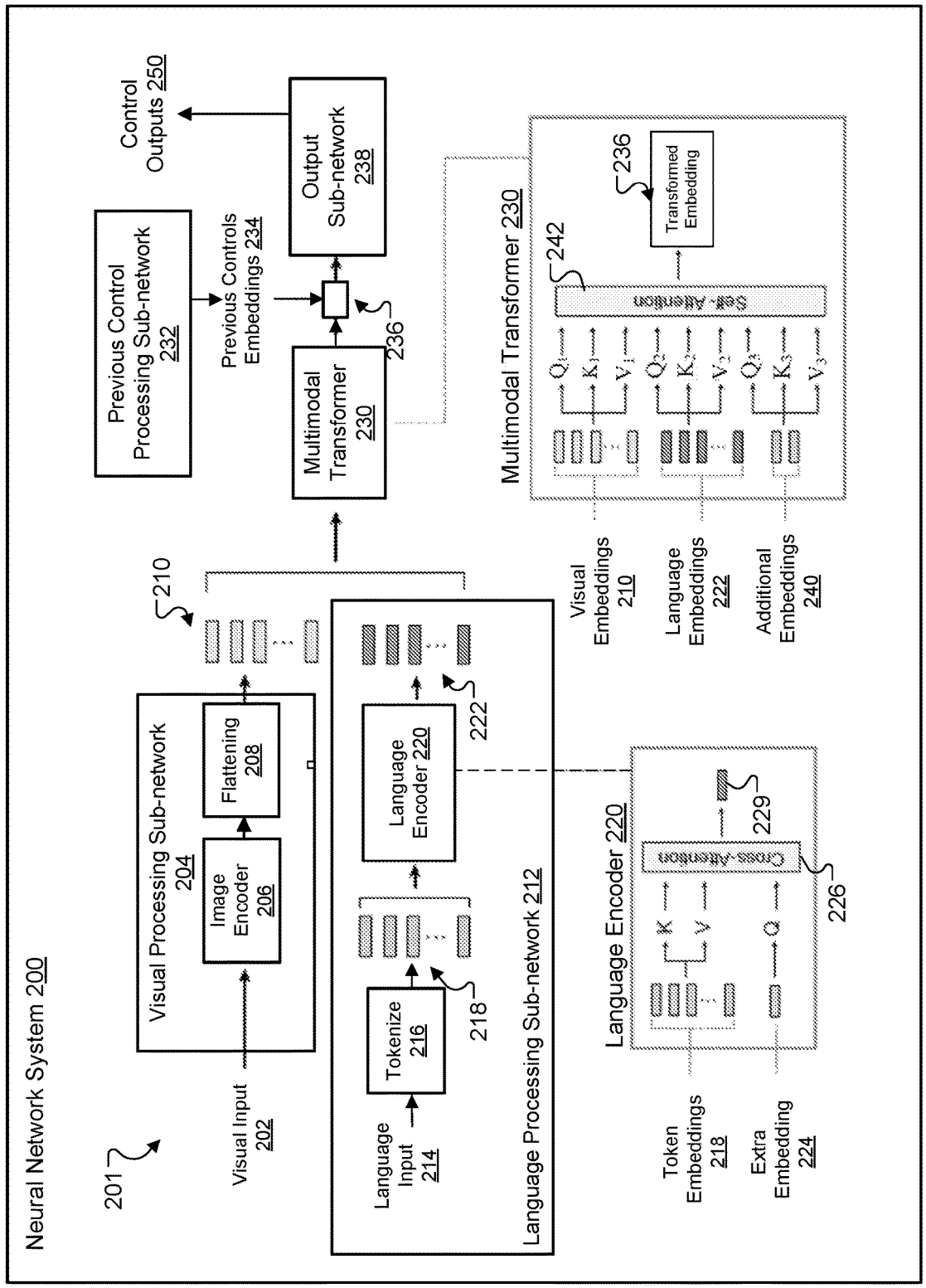
FIG. 2 shows an example architecture of the neural network system that is described in the description associated with FIG. 1.

FIG. 2 shows an example of the architecture of the neural network system 100 described above with reference to FIG. 1. The neural network system 200 shown in FIG. 2 is an example of a system implemented as computer programs on one or more computers in one or more locations, in which the systems, components, and techniques described below can be implemented.

The neural network system 200 includes a neural network 201 that has multiple sub-networks: a visual processing sub-network (204), a language processing sub-network (212), a previous control processing sub-network (232), a multimodal transformer sub-network (230), and an output sub-network (238).

To control a particular computer to execute a task, at each of a series of time steps during the execution of the task, the system 200 receives a control input that includes a visual input 202. The visual input 202 includes one or more screen frames of a computer display that represents at least a current state of the particular computer. For example, a screen frame in the visual input is an image (e.g., a screenshot of the computer display) that represents a step in a process of executing the task on the particular computer.

In some implementations, the computer display is the display of the particular computer and the system 200 executes one or more actions on the particular computer to control the particular computer.

In some implementations when the particular computer is a remote computer, the system 100 may receive a control input from a local computer (e.g., a thin client) and processes the control input to generate one or more control outputs to control the remote computer. In these implementations, the computer display is the display of the local computer and the actions are executed on the local computer. The actions may cause the local computer to interact with the particular computer (e.g. over a communication network) to control the particular computer.

The neural network system 200 processes the control input using the neural network 201 to generate one or more control outputs 250 that are used to control the particular computer to execute the task.

The visual processing sub-network 204 includes an image encoder sub-network 206 and a flattening sub-network 208. The image encoder neural network can be a convolutional neural network such as a ResNet. For example, the image encoder neural network can be a ResNet that has one or more ResNet blocks (e.g., four, five, or seven ResNet blocks). The image encoder neural network 206 is configured to process the visual input 202 to generate one or more encoded visual feature vectors. The flattening subnet-work 208 is configured to flatten the one or more encoded visual feature vectors to generate one or more visual embeddings 210.

In some implementations, the control input further includes one or more language inputs (e.g., the language input 214), one or more previous controls, or both. A previous control is an action that was previously performed, i.e., the action that was sampled from a probability distribution defined by a previous control output generated by the neural network system 200 at a previous time step. The one or more language inputs include a task instruction input. Alternatively or additionally, the one or more language inputs may include a task field input including one or more task fields. The one or more task fields include information organized into different categories that describes the task to be solved. Below is an example of a task instruction input and task fields.

Task Instruction Input
    Book the shortest one-way flight from: HVR to: Fayetteville, AR on Dec. 27, 2016."

Task Fields
    criterion: 'shortest' date: 'Dec. 27, 2016'
from: 'HVR'
to: 'Fayetteville, AR'

In some implementations, the one or more language inputs may optionally include a Document Object Model (DOM) element input that includes one or more DOM elements.

The task instruction input is an input from a user of the system that specifies what the task is. The task instruction input may include a text instruction input or a voice instruction input. For example, the task instruction input can be a text that instructs the system to organize items by, e.g., dragging them. For instance, the text may state "Sort the following numbers in increasing order: 13, −39, 9, 43." As another example, the task instruction input includes a transcription of the user's verbal instruction that instructs the system to book a ticket. For instance, the verbal instruction says "Book the shortest one-way flight from: Santa Rosa, CA to: SAT on Jan. 31, 2022."

The language processing sub-network 212 includes a tokenization layer 216 and a language encoder sub-network 220. In some implementations, the language encoder sub-network 220 is a 1-layer transformer with 4 heads. The tokenization layer 216 is configured to split a language input 214 into tokens and generate, for each token in the tokens, a corresponding token embedding 218. The language encoder sub-network 220 is configured to attend over the token embeddings 218 to generate a respective language embedding 222 for the language input 214. In particular, the language encoder sub-network 220 processes the token embeddings 218 to generate a key vector K and a value vector V, processes an extra embedding to generate a query vector Q, and processes the key vector K, the value vector V, and the query vector Q using a cross-attention mechanism 126 to generate the respective language embedding 229 for the language input 214. The extra embedding may be constant, e.g. independent of the control input. It may be learnt as part of the training of the neural network system 200, or pre-set (e.g. randomly) before the training.

The previous control processing sub-network 232 is configured to process one or more previous controls to generate a previous control embedding 234. A previous control is a control output generated by the neural network system 200 at a previous time step.

The multimodal transformer sub-network 230 is configured to combine the one or more visual embeddings 210 generated by the visual processing sub-network 204 and one or more language embeddings 222 generated by the language encoder sub-network 220 to generate a transformed embedding 236.

In particular, the multimodal transformer subnetwork 230 is configured to process the one or more visual embeddings 210 to generate a visual query vector $Q_1$, a visual key vector $K_1$, and a visual value vector $V_1$. The multimodal transformer subnetwork 230 is configured to process the one or more language embeddings 222 to generate a language query vector $Q_2$, a language key vector $K_2$, and a language value vector $V_2$. The multi-modal transformer subnetwork 230 is configured to process one or more additional embeddings 240 to generate an extra query vector $Q_3$, an extra key vector $K_3$, and an extra value vector $V_3$. The one or more additional embeddings may be constant, e.g. independent of the control input. They may be learnt as part of the training of the neural network system 200, or pre-set (e.g. randomly) before the training. The multimodal transformer subnetwork 230 uses a self-attention mechanism 242 to process the visual query vector $Q_1$, the visual key vector $K_1$, the visual value vector $V_1$, the language query vector $Q_2$, the language key vector $K_2$, the language value vector $V_2$, the extra query vector $Q_3$, the extra key vector $K_3$, the extra value vector $V_3$ to generate the transformed embedding 236

The output sub-network 238 processes the transformed embedding 236 and the previous controls embeddings 234 to generate one or more control outputs 250 that are used to control the particular computer to execute the task. The one or more control outputs 250 include at least one of an action type output, a cursor coordinate output, a keyboard key index output, or a task field index output. The action type output, the cursor coordinate output and the keyboard key index output can be produced via linear transformations while the task field index output can be produced via an attention-based policy.

In particular, to generate a task field index output, the output sub-network 238 includes one or more long short-term memory (LSTM) layers. The output sub-network 238 further includes an attention policy sub-network (not shown) configured to process an output of the one or more LSTM layers to generate the task field index output. In particular, the attention policy sub-network is configured to use the corresponding output of the two LSTM layers as a query vector, process the corresponding task field embeddings generated by the task field language processing sub-network to generate a key vector and a value vector, and use a cross-attention mechanism to process the query vector, the key vector, and the value vector to generate the task field index output.

The system 200 determines one or more actions from the one or more control outputs 250. Each control output of the one or more control outputs 250 can be modeled by a probability distribution (e.g., a single discrete probability distribution, except for cursor coordinates which are modeled by two discrete distribution (for height and width coordinates)). As discussed above, the one or more control outputs 250 include at least one of an action type output, a cursor coordinate output, a keyboard key index output, or a task field index output. To determine the one or more actions, the system 200 first selects, based on the action type output (which is a probability distribution), an action type from a set of possible actions including a no-op (indicating no action), mouse or touch-screen actions and keyboard actions. The one or more actions of the selected action type will be carried out as specified in the remainder of the one or more control outputs 250. For example, if move mouse was selected, the cursor coordinate output specifies the location that the cursor should be moved to. If emit text was selected, the task-field index output specifies which task-field string to emit. If key press was selected, the keyboard key index output specifies which key to emit.

The system 200 then executes the one or more actions to control the particular computer. In particular, the system automatically issues commands using a computer control Application Programming Interface (API) to instruct the particular computer to perform the one or more actions.

The neural network 201 or any neural network that generates the control outputs from the control input may be trained by the system 200 or another training system on a training dataset. The learning may be at least partly on the basis of a training dataset of human demonstrations, i.e. real-world observations of actions of a human user as registered by data input devices (e.g. a keyboard, pointer device and/or a touchscreen) operated by the user. The control inputs for corresponding time-steps of these demonstrations may comprise images displayed to the human user on the display device of the particular computer while the demonstration was carried out, i.e. the display based upon which the human user took the actions. Many techniques for training a neural network to imitate human demonstrations ("imitation learning") are known.

For example, the neural network 201 may be trained using imitation learning, and optionally, reinforcement learning. In some implementations, the system 200 co-trains the neural network 101 using both i) imitation learning to imitate one or more behaviors of human demonstrations, and ii) reinforcement learning. "Co-training" refers to a known semi-supervised learning technique which trains two classifiers based on two different types of data (e.g. human demonstrations and "automatic trajectories" (sequences) of actions automatically selected (i.e. without human involvement) by the semi-trained neural network system 200). The classifiers (e.g. the classifier for human demonstrations) may be used to generate labels for the automatic trajectories, to generate rewards for the automatically selected actions, to permit reinforcement learning based on the automatic trajectories.

The neural network 201 may be trained using a training dataset in which data of the two types is mingled and used interchangeably. The human demonstrations are input-output sequences generated as a result of human interaction with the particular computer (or another equivalent computer). The fact that the inputs and outputs of the neural network are in the same space that can be observed from human interactions allows for the system to train the neural network on a large dataset through imitation learning.

In some other implementations, the system 200 first trains the neural network 201 using imitation learning to imitate the behavior of human demonstrations, and subsequently trains the neural network 201 using reinforcement learning. In particular, the system 200 may receive a reward after the neural network 201 executes each action and/or after the particular computer controlled by the neural network 201 completes the task. The system 200 may use the received rewards to train the neural network 201 using reinforcement learning.

In some implementations, the system 200 may co-train the neural network 201 on multiple tasks. This is for two reasons. First, there is a significant transfer effect, with training being more efficient per frame of each task seen for co-training. Second, the ultimate objective is a generally useful computer/agent, and therefore it is desirable to have one computer/agent with as many capabilities as possible.

In particular, to co-train the neural network 201 on multiple tasks, the system 200 train the neural network 201 to solve multiple tasks at the same time, by randomly sampling tasks to solve and training on this mixture of tasks. This is in contrast to training a separate neural network to solve each task individually.

Figure 4:
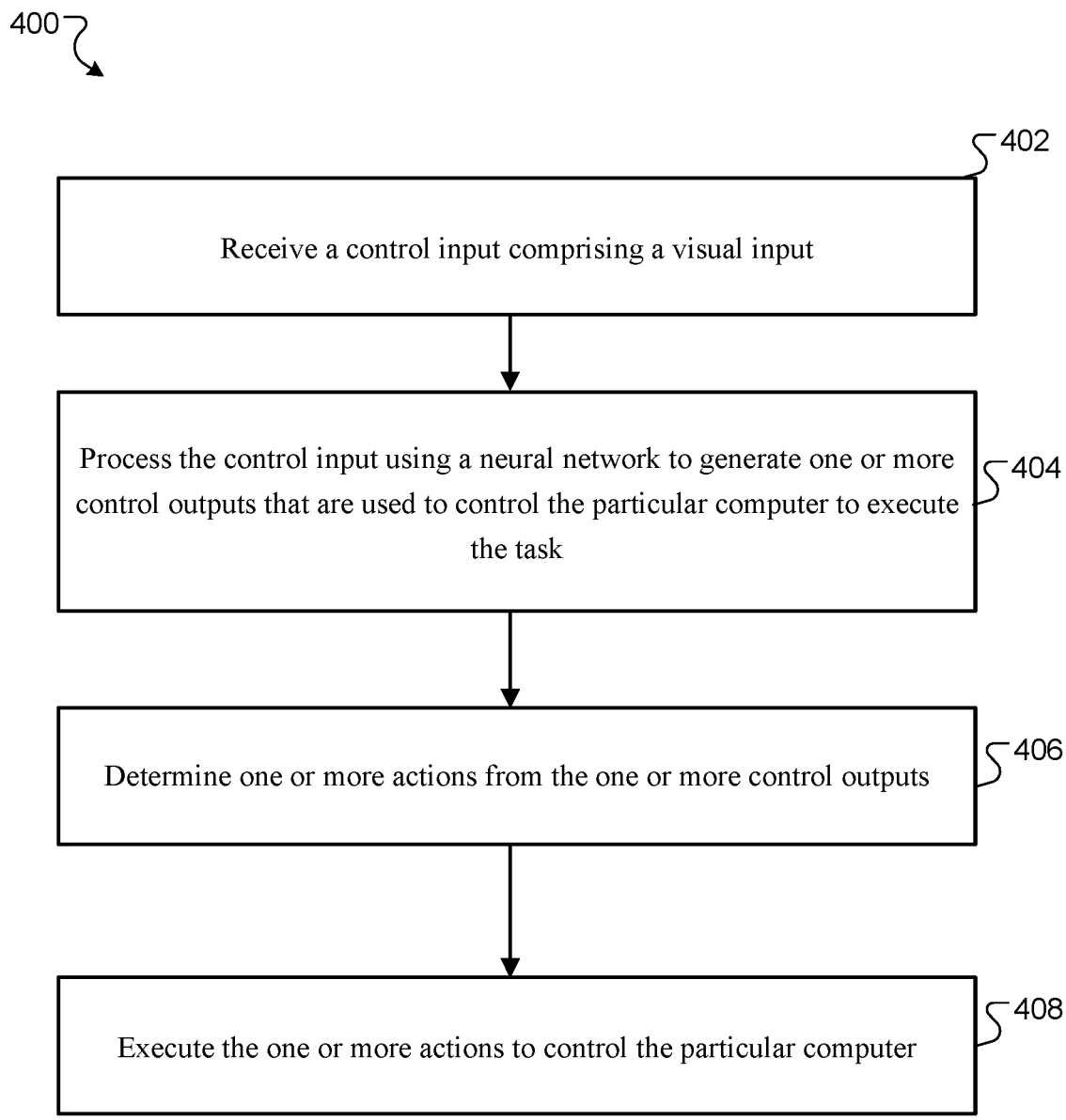
FIG. 4 is a flow diagram of an example process for controlling a particular computer to execute a task.

FIG. 4 is a flow diagram of an example process 400 for controlling a particular computer to perform a task. The task is one of a plurality of daily tasks (i.e. tasks which are statistically representative of the types of task which most users perform occasionally using computers) performed on the particular computer. The plurality of tasks may include, but are not limited to, clicking on a canvas, dragging an item on the screen, filling a form, transforming a text, forwarding an email, making a reservation, and booking a ticket.

For convenience, the process 400 will be described as being performed by a system of one or more computers located in one or more locations. For example, a neural network system, e.g., the neural network system 100 of FIG. 1, appropriately programmed in accordance with this specification, can perform the process 400.

The process 400 is performed at each of a series of time steps during the execution of the task, i.e., after the system receives a task instruction specifying the task until the task is completed.

The system receives a control input that includes a visual input (step 402). The visual input includes one or more screen frames of a computer display that represent at least a current state of the particular computer. A screen frame in the visual input is an image that represents a step in a process of executing the task on the particular computer.

In some implementations, the control input further includes one or more language inputs, one or more previous controls, or both. In some implementations, the one or more language inputs include at least one of i) a task instruction input, or ii) a task field input including one or more task fields. The task instruction input may include a text instruction input or a voice instruction input. In some implementations, the one or more language inputs include a Document Object Model (DOM) element input that includes one or more DOM elements.

The system processes the control input using a neural network to generate one or more control outputs that are used to control the particular computer to execute the task (step 404). The one or more control outputs include an action type output that specifies at least one of a pointing device action or a keyboard action to be performed to control the particular computer. In some implementations, the action type output specifies an action to take control of the particular computer from another operator for a portion of a process of executing the task. This facilitates a situation in which the trained neural network system may cooperate with a human user to control the particular computer, with the trained neural network taking over control of the particular computer from the human user in certain circumstances (e.g. to perform an operation which it is tedious for a human user to control the particular computer to perform). The voice instruction input may specify that the neural network system is to take control of the particular computer for the portion of the process of executing the task.

The pointing device action is one of a plurality of actions of a pointing device associated with the particular computer. The plurality of actions may include one or more of: inputs submitted using a computer mouse, inputs submitted through a touchscreen device, or inputs submitted through a touchpad device. The keyboard action may be one of a key press or a text emission.

In some implementations, the one or more control outputs include at least one of i) a cursor coordinate output, ii) a keyboard key index output, or iii) a task field index output. The cursor coordinate output includes an x-coordinate and a y-coordinate that represent a desired cursor position on the display of the particular computer.

In some implementations, the neural network includes a visual processing sub-network, one or more language processing sub-networks, a previous control processing sub-network, a multimodal transformer sub-network, and an output sub-network. Processing the control input using the neural network to generate the one or more control outputs in these implementation is described in more detail below with reference to FIG. 5.

The system determines one or more actions from the one or more control outputs (step 406). Each control output of the one or more control outputs can be modeled by a probability distribution (e.g., a single discrete probability distribution, except for cursor coordinates which are modeled by two discrete distribution (for height and width coordinates)). As discussed above, the one or more control outputs include at least one of an action type output, a cursor coordinate output, a keyboard key index output, or a task field index output. To determine the one or more actions, the system first selects, based on the action type output (which is a probability distribution), an action type from a set of possible actions including a no-op (indicating no action), mouse or touch-screen actions and keyboard actions. The one or more actions of the selected action type will be carried out as specified in the remainder of the one or more control outputs. For example, if move mouse was selected, the cursor coordinate output specifies the location that the cursor should be moved to. If emit text was selected, the task-field index output specifies which task-field string to emit. If key press was selected, the keyboard key index output specifies which key to emit.

The system executes the one or more actions to control the particular computer (step 408). In particular, the system automatically issues commands using a computer control Application Programming Interface (API) to instruct the particular computer to perform the one or more actions. For example, if the one or more actions are mouse actions such as moving a cursor to an object on a display, clicking and holding the left button of the mouse, and dragging the object to another position, the system automatically issues commands using a computer control API to instruct the particular computer to perform the mouse actions to drag the object to the desired position. The possible actions may not include any actions which a human user would be unable to perform using a mouse, touchscreen or keyboard.

As noted above, the method 400 may include taking over control of the particular computer from a user. Thus, the method 400 provides a user interface which permits a portion of a task to be performed automatically, e.g. upon a user's command. To put this another way, the particular computer may receive one or more inputs from a human user to control the particular computer to perform a first portion of task. Subsequently, the user may issue an instruction (e.g. in the form of the task instruction, for example by speaking a command which is registered by a microphone) to the neural network system which specifies that the neural network is to perform a second portion of a task which follows the first portion of the task. That is, the neural network system is to take control of the particular computer. At that stage, the method of FIG. 4 may be performed at each of one or more successive time steps, whereby the one or more actions performed by the particular computer (when step 408 is performed in each of the time steps) control the computer to perform the second portion of the task. In the first few performances of the method 400, the previous controls used in method 400 may be based on actions specified by the user in performing the first portion of the task.

Figure 5:
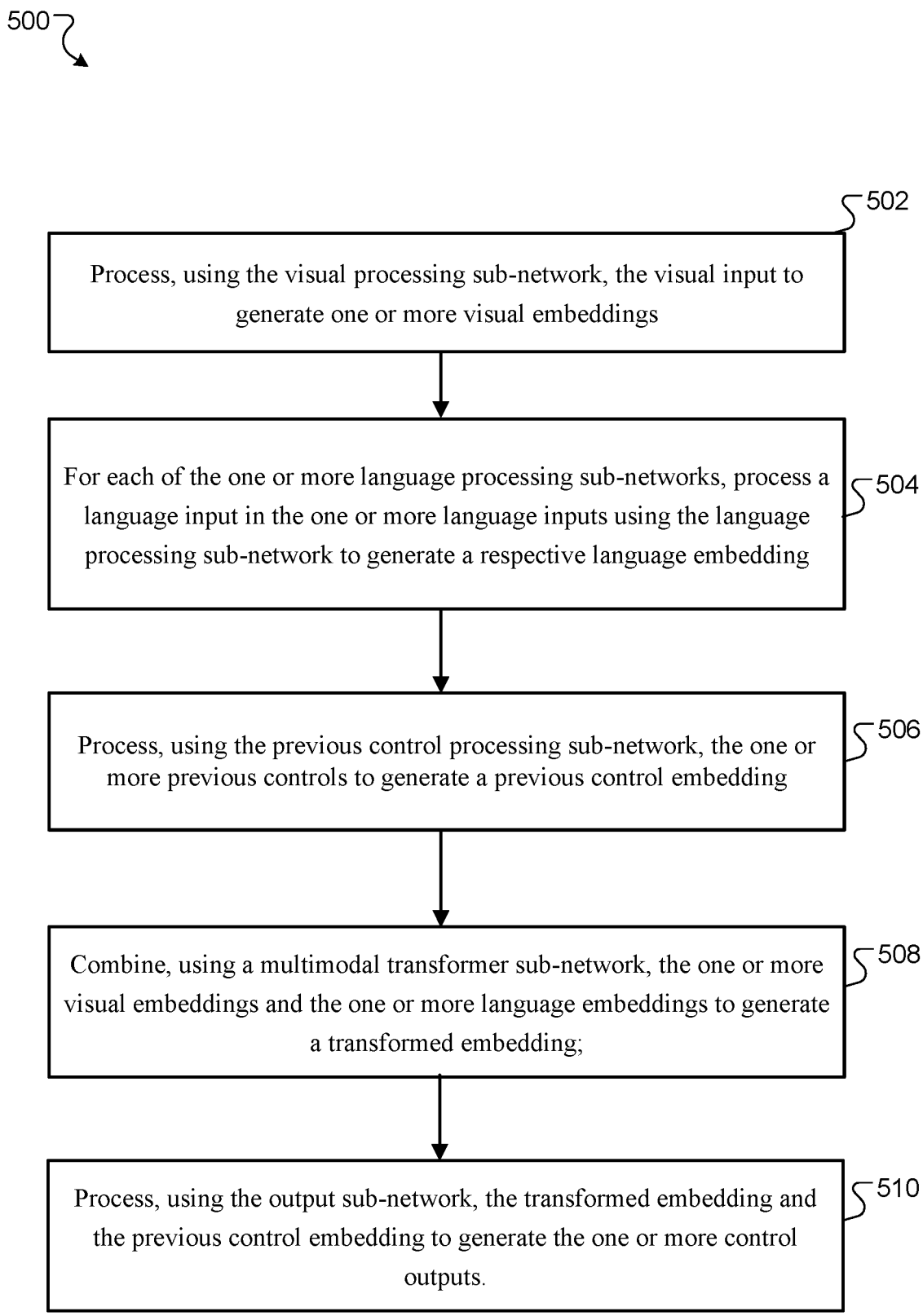
FIG. 5 is a flow diagram of an example process for processing the control input using the neural network to generate the one or more control outputs.

FIG. 5 is a flow diagram of an example process 500 for processing the control input using the neural network to generate the one or more control outputs. For convenience, the process 500 will be described as being performed by a system of one or more computers located in one or more locations. For example, a neural network system, e.g., the neural network system 100 of FIG. 1, appropriately programmed in accordance with this specification, can perform the process 500.

The process 500 is performed at each of a series of time steps during the execution of the task, i.e., after the system receives a task instruction specifying the task until the task is completed.

The system processes, using the visual processing sub-network, the visual input to generate one or more visual embeddings (step 502). In some implementations, the visual processing sub-network includes an image encoder sub-network and a flattening sub-network. The image encoder sub-network can be a ResNet. The ResNet may have four ResNet blocks.

The system processes, using the visual processing sub-network, the visual input to generate one or more visual embeddings by processing, using the image encoder sub-network, the visual input to generate one or more encoded visual feature vectors, and flattening the one or more encoded visual feature vectors by using the flattening sub-network to generate the one or more visual embeddings.

For each of the one or more language processing sub-networks, the system processes a language input in the one or more language inputs using the language processing sub-network to generate a respective language embedding (step 504).

In some implementations, each language processing sub-network includes a tokenization layer and a language encoder sub-network. The language encoder sub-network can be a language transformer. The language transformer can have a 1-layer transformer with 4 heads.

In these implementations, the system processes the language input in the one or more language inputs using the language processing sub-network to generate the respective language embedding by (i) splitting, using the tokenization layer, the respective language input into tokens and generating, for each token in the tokens, a corresponding token embedding, and (ii) attending over the token embeddings by using the language encoder sub-network to generate the corresponding language embedding. To attend over the token embeddings to generate the corresponding language embedding, the system processes the token embeddings to generate a key vector and a value vector, processes an extra embedding to generate a query vector, and processes the key vector, the value vector, and the query vector using a cross-attention mechanism to generate the corresponding language embedding.

The system processes, using the previous control processing sub-network, the one or more previous controls to generate a previous control embedding (step 506).

The system combines, using a multimodal transformer sub-network, the one or more visual embeddings and the one or more language embeddings to generate a transformed embedding (step 508). In particular, in some implementations, the system processes the one or more visual embeddings to generate a visual query vector, a visual key vector, and a visual value vector. The system processes the one or more language embeddings to generate a language query vector, a language key vector, and a language value vector. The system processes one or more additional embeddings to generate an extra query vector, an extra key vector, and an extra value vector. The system then uses a self-attention mechanism to process the visual query vector, the visual key vector, the visual value vector, the language query vector, the language key vector, the language value vector, the extra query vector, the extra key vector, the extra value vector to generate the transformed embedding.

The system processes, using the output sub-network, the transformed embedding and the previous control embedding to generate the one or more control outputs (step 510). The output sub-network may include one or more long short-term memory (LSTM) layers. The system may process, using the output sub-network, a concatenation of the transformed embedding and the previous control embedding to generate the one or more control outputs.

The output sub-network may further include an attention policy sub-network configured to process an output of the one or more LSTM layers to generate a task field index output. The attention policy sub-network may be configured to use the corresponding output of the two LSTM layers as a query vector, process the corresponding task field embeddings generated by the task field language processing sub-network to generate a key vector and a value vector, and use a cross-attention mechanism to process the query vector, the key vector, and the value vector to generate the task field index output.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a Jax framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for controlling a particular computer to execute a task, the method comprising:

receiving a control input comprising a visual input, the visual input comprising one or more screen frames of a computer display that represent at least a current state of the particular computer;

processing the control input using a neural network to generate a plurality of control outputs that are used to control the particular computer to execute the task, wherein the plurality of control outputs comprise (i) an action type output that specifies a single discrete probability distribution over a set of possible actions that could be performed to control the computer, wherein the set of possible actions comprise at least a pointing device action and a keyboard action and (ii) a cursor coordinate output that specifies two discrete probability distributions over possible cursor coordinates;

determining one or more actions based on at least one of the single discrete probability distribution specified by the action type output and the two discrete probability distributions specified by the cursor coordinate output; and executing the one or more actions to control the particular computer.

2. The method of claim 1, wherein the pointing device action is one of a plurality of actions of a pointing device associated with the particular computer, the plurality of actions comprising one or more of: inputs submitted using a computer mouse, inputs submitted through a touchscreen device, or inputs submitted through a touchpad device.

3. The method of claim 1, wherein the keyboard action is one of a key press or a text emission.

4. The method of claim 1, wherein a screen frame in the visual input is an image that represents a step in a process of executing the task on the particular computer.

5. The method of claim 1, wherein the control input further comprises one or more language inputs, one or more previous controls, or both.

6. The method of claim 5, wherein the one or more language inputs comprise at least one of i) a task instruction input, or ii) a task field input comprising one or more task fields.

7. The method of claim 6, wherein the task instruction input comprises a text instruction input or a voice instruction input.

8. The method of claim 5, wherein the one or more language inputs comprise a Document Object Model (DOM) element input comprising one or more DOM elements.

9. The method of claim 5, wherein the neural network comprises a visual processing sub-network, one or more language processing sub-networks, a previous control processing sub-network, a multimodal transformer sub-network, and an output sub-network, and wherein processing the control input using the neural network to generate the plurality of control outputs comprises:
processing, using the visual processing sub-network, the visual input to generate one or more visual embeddings;
processing each language input in the one or more language inputs using the language processing sub-network to generate a respective language embedding;
processing, using the previous control processing sub-network, the one or more previous controls to generate a previous control embedding;
combining, using a multimodal transformer sub-network, the one or more visual embeddings and the one or more language embeddings to generate a transformed embedding; and
processing, using the output sub-network, the transformed embedding and the previous control embedding to generate the plurality of control outputs.

10. The method of claim 9, wherein the visual processing sub-network comprises a image encoder sub-network and a flattening sub-network, and
wherein processing, using the visual processing sub-network, the visual input to generate one or more visual embeddings comprises:
processing, using the image encoder sub-network, the visual input to generate one or more encoded visual feature vectors, and
flattening the one or more encoded visual feature vectors by using the flattening sub-network to generate the one or more visual embeddings.

11. The method of claim 10, wherein the image encoder sub-network is a ResNet which has four ResNet blocks.

12. The method of claim 9, wherein each language processing sub-network comprises a tokenization layer and a language encoder sub-network, and
wherein processing the language input in the one or more language inputs using the language processing sub-network to generate the respective language embedding comprises:
splitting, using the tokenization layer, the respective language input into tokens and generating, for each token in the tokens, a corresponding token embedding, and
attending over the token embeddings by using the language encoder sub-network to generate the corresponding language embedding.

13. The method of claim 12, wherein the language encoder sub-network is a 1-layer transformer with 4 heads.

14. The method of claim 12, wherein attending over the token embeddings to generate the corresponding language embedding comprises:
processing the token embeddings to generate a key vector and a value vector,
processing an extra embedding to generate a query vector, and
processing the key vector, the value vector, and the query vector using a cross-attention mechanism to generate the corresponding language embedding.

15. The method of claim 9, wherein generating the transformed embedding using the multimodal transformer sub-network comprises:
processing the one or more visual embeddings to generate a visual query vector, a visual key vector, and a visual value vector,
processing the one or more language embeddings to generate a language query vector, a language key vector, and a language value vector,
processing one or more additional embeddings to generate an extra query vector, an extra key vector, and an extra value vector,
using a self-attention mechanism to process the visual query vector, the visual key vector, the visual value vector, the language query vector, the language key vector, the language value vector, the extra query vector, the extra key vector, the extra value vector to generate the transformed embedding.

16. The method of claim 9, wherein the output sub-network comprises one or more long short-term memory (LSTM) layers.

17. The method of claim 16, wherein the output sub-network further comprises an attention policy sub-network configured to process an output of the one or more LSTM layers to generate a task field index output.

18. The method of claim 17, wherein the attention policy sub-network is configured to:
use the corresponding output of the two LSTM layers as a query vector,
process the corresponding task field embeddings generated by the task field language processing sub-network to generate a key vector and a value vector, and
use a cross-attention mechanism to process the query vector, the key vector, and the value vector to generate the task field index output.

19. The method of claim 9, wherein processing, using the output sub-network, the transformed embedding and the previous control embedding to generate the plurality of control outputs comprising: processing, using the output sub-network, a concatenation of the transformed embedding and the previous control embedding to generate the plurality of control outputs.

20. The method of claim 1, wherein the plurality of control outputs further comprise other outputs, the other outputs comprising at least one of a keyboard key index output or a task field index output.

21. The method of claim 20, wherein executing the one or more actions to control the particular computer comprises: executing the one or more actions in a manner specified by the other outputs to control the particular computer.

22. The method of claim 1, where the cursor coordinate output comprises an x-coordinate and a y-coordinate that represent a desired cursor position on the display of the particular computer.

23. The method of claim 1, wherein the task is one of a plurality of tasks performed on the particular computer, the plurality of tasks comprising clicking on a canvas, dragging an item on the screen, filling a form, editing text, highlighting text, forwarding an email, making a reservation, and booking a ticket.

24. The method of claim 1, further comprising: co-training the neural network using i) imitation learning to imitate one or more behaviors of human demonstration, and ii) reinforcement learning.

25. The method of claim 1, further comprising:
training the neural network using imitation learning to imitate the behavior of human demonstration as shown in the visual input, and
training the neural network using reinforcement learning.

26. The method of claim 1, wherein during training of the neural network, the visual input demonstrates how a human would execute the task on the particular computer.

27. The method of claim 1, wherein the neural network has been trained using imitation learning, and optionally, reinforcement learning.

28. The method of claim 1, wherein the action type output specifies an action to take control of the particular computer from another operator for a portion of a process of executing the task.

29. The method of claim 1, wherein the particular computer is configured to receive one or more inputs from a human user to control the particular computer to perform a first portion of the task, and, upon receiving a command from a user, the neural network is configured to take control of the particular computer, whereby the neural network generates the one or more actions to control the particular computer to perform a second portion of the task which follows the first portion.

30. A system comprising:
one or more computers; and
one or more non-transitory computer storage media storing instructions that, when executed by the one or more computers, cause the one or more computers to perform operations for controlling a particular computer to execute a task, the operations comprising:
receiving a control input comprising a visual input, the visual input comprising one or more screen frames of a computer display that represent at least a current state of the particular computer;
processing the control input using a neural network to generate a plurality of control outputs that are used to control the particular computer to execute the task, wherein the plurality of control outputs comprise (i) an action type output that specifies a single discrete probability distribution over a set of possible actions that could be performed to control the computer, wherein the set of possible actions comprise at least a pointing device action and a keyboard action and (ii) a cursor coordinate output that specifies two discrete probability distributions over possible cursor coordinates;
determining one or more actions based on at least one of the single discrete probability distribution specified by the action type output and the two discrete probability distributions specified by the cursor coordinate output; and
executing the one or more actions to control the particular computer.

31. One or more non-transitory computer storage media storing instructions that, when executed by one or more computers, cause the one or more computers to perform operations for controlling a particular computer to execute a task, the operations comprising:
receiving a control input comprising a visual input, the visual input comprising one or more screen frames of a computer display that represent at least a current state of the particular computer;
processing the control input using a neural network to generate a plurality of control outputs that are used to control the particular computer to execute the task, wherein the plurality of control outputs comprise at least one of (i) an action type output that specifies a single discrete probability distribution over a set of possible actions that could be performed to control the computer, wherein the set of possible actions comprise at least a pointing device action and a keyboard action, and (ii) a cursor coordinate output that specifies two discrete probability distributions over possible cursor coordinates;
determining one or more actions based on at least one of the single discrete probability distribution specified by the action type output and the two discrete probability distributions specified by the cursor coordinate output; and
executing the one or more actions to control the particular computer.

32. A system comprising one or more computers and one or more storage devices storing instructions that, when executed by the one or more computers, cause the one or more computers to implement a neural network configured to process a control input to generate a plurality of control outputs for controlling a particular computer to execute a task, the control input comprising (i) a visual input comprising one or more screen frames of a computer display that represent at least a current state of the particular computer, (ii) one or more language inputs, and (iii) one or more previous controls, the neural network comprising:
a visual processing sub-network configured to process the visual input to generate one or more visual embeddings;
one or more language processing sub-networks, each language processing sub-network configured to process a language input in the one or more language inputs to generate a respective language embedding;
a previous control processing sub-network to process the one or more previous controls to generate a previous control embedding;
a multimodal transformer sub-network configured to combine the one or more visual embeddings and the one or more language embeddings to generate a transformed embedding; and
an output sub-network configured to process the transformed embedding and the previous control embedding to generate the plurality of control outputs, wherein the plurality of control outputs comprise (i) an action type output that specifies a single discrete probability distribution over a set of possible actions that could be performed to control the computer, wherein the set of possible actions comprise at least a pointing device action and a keyboard action and (ii) a cursor coordinate output that specifies two discrete probability distributions over possible cursor coordinates,
wherein the instructions further cause the one or more computers to system is configured to:
determine one or more actions based on the single discrete probability distribution specified by the action type output and the two discrete probability distributions specified by the cursor coordinate output; and
execute the one or more actions to control the particular computer.

* * * * *